US012792437B2

(12) United States Patent

Adelman

(10) Patent No.: US 12,792,437 B2
(45) Date of Patent: Nov. 10, 2026

(54) PERFORMING ERROR DETECTION IN A PROCESSING CYCLE BASED ON A SIZE OF AN INPUT VALUE

(71) Applicant: Google LLC, Mountain View, CA (US)

(72) Inventor: Menachem Adelman, Modi'in (IL)

(73) Assignee: Google LLC, Mountain View, CA (US)

( * ) Notice: Subject to any disclaimer, the term of this patent is extended or adjusted under 35 U.S.C. 154(b) by 104 days.

(21) Appl. No.: 18/911,348

(22) Filed: Oct. 10, 2024

(65) Prior Publication Data

US 2026/0104955 A1 Apr. 16, 2026

(51) Int. Cl.

*G06F 11/00* (2006.01)
*G06F 11/07* (2006.01)
*G06F 11/10* (2006.01)

(52) U.S. Cl.

CPC ...... *G06F 11/0751* (2013.01); *G06F 11/1004* (2013.01)

(58) Field of Classification Search

CPC .......................... G06F 11/0751; G06F 11/1004
See application file for complete search history.

(56) References Cited

U.S. PATENT DOCUMENTS 8,161,365 B1 * 4/2012 Awalt ................ H03M 13/6575 714/781
8,255,754 B2 8/2012 Tsfati et al.
8,464,125 B2 6/2013 Gopal et al.
9,003,259 B2 4/2015 Cooper
9,124,298 B2 9/2015 Zopf
10,171,108 B1 * 1/2019 Yan ......................... H04L 1/004
10,211,852 B2 2/2019 Mei et al.
11,626,887 B1 4/2023 Chandrasekher et al.
11,677,419 B2 6/2023 Maunder et al.
2005/0204263 A1 9/2005 Ricci
2010/0131832 A1 * 5/2010 Cooper ............... G06F 11/0763 714/E11.032
2014/0026021 A1 * 1/2014 Hill ..................... G06F 11/1004 714/E11.032

(Continued)

FOREIGN PATENT DOCUMENTS

CN 115001508 A 9/2022
CN 117014017 A 11/2023

OTHER PUBLICATIONS

Chi et al. Exploring Various Levels of Parallelism in High-Performance CRC Algorithms. IEEE Access, vol. 7, Mar. 6, 2019 (Mar. 6, 2019),-Mar. 26, 2019 (Mar. 26, 2019), pp. 32315-32326, DOI: 10.1109/ACCESS.2019.2903304.

(Continued)

*Primary Examiner* — Elmira Mehrmanesh
(74) *Attorney, Agent, or Firm* — Lerner David LLP

(57) ABSTRACT

Aspects of the disclosure are directed to an error detection approach performed in a processing cycle with improved accuracy and reduced latency. The approach involves determining whether the size of a received input value is greater than, equal to, or less than the size of an accumulator value and performing error detection accordingly using parallel lookup tables corresponding to portions of the input value. To avoid bit reversals in the error detection approach, results stored in the lookup tables may be stored in a bit reversed order. For input values that are less than the size of an accumulator value, the accumulator value is split into two portions to increase accuracy of the error detection result.

20 Claims, 10 Drawing Sheets

(56) References Cited

U.S. PATENT DOCUMENTS

| | | | | |
|---|---|---|---|---|
| 2015/0207507 | A1* | 7/2015 | Kuang | H03M 13/6561 326/93 |
| 2016/0337083 | A1* | 11/2016 | Englert | H04L 1/0061 |
| 2017/0075754 | A1* | 3/2017 | Wang | H03M 13/09 |
| 2018/0143872 | A1* | 5/2018 | Sun | H03M 13/6502 |
| 2021/0067173 | A1 | 3/2021 | Miele | |
| 2022/0173752 | A1 | 6/2022 | Miele | |
| 2024/0072933 | A1 | 2/2024 | Cami Gonzalez | |

OTHER PUBLICATIONS

Extended European Search Report for European Patent Application No. 25207720.1 dated Feb. 26, 2026. 14 pages.

Arm Architecture Reference Manual for A-profile architecture. Chapter C6. 964 pages. Copyright 2013-2024. Retrieved from the Internet: <https://developer.arm.com/documentation/ddi0487/latest/>.

Arm Neoverse V3 Core. Revision: r0p0. Software Optimization Guide. Issue 2.0. 2023. 67 pages. Retrieved from the Internet: <https://developer.arm.com/documentation/109678/latest/>.

Gopal et al. Fast CRC Computation for Generic Polynomials Using PCLMULQDQ Instruction. Dec. 2009. pp. 1-23.

Huo et al. High Performance Table-Based Architecture for Parallel CRC Calculation. The 21st IEEE International Workshop on Local and Metropolitan Area Networks. Jun. 1, 2015. 6 pages.

Intel Processors and Processor Cores Based on Golden Cove Microarchitecture Instruction Throughput and Latency. Revision 2.0. Mar. 14, 2022. 68 pages. Retrieved from the Internet: <https://www.intel.com/content/www/us/en/content-details/723498/intel-processors-and-processor-cores-based-on-golden-cove-microarchitecture-instruction-throughput-and-latency.html?wapkw=Golden%20Cove%20Microarchitecture%20Instruction%20Throughput%20and%20Latency>.

Manu G et al. A New Approach for Parallel CRC Generation for High Speed Application. International Journal of Advanced Engineering and Global Technology vol. 2(2), Feb. 2014, pp. 418-430.

* cited by examiner

PERFORMING ERROR DETECTION IN A PROCESSING CYCLE BASED ON A SIZE OF AN INPUT VALUE

BACKGROUND

Error detection may involve a cyclic redundancy check (CRC) when data streams are transferred or processed. CRC can involve two source registers. The first register holds input data, and the second register holds accumulator data. The accumulator data can be an accumulated value from previous iterations of the error detection.

Typically, CRC reverses the bits of the accumulator data and the input data, performs a XOR operation, performs polynomial division to obtain a remainder, and reverses the bits of the remainder to produce a result indicating whether there is an error in the input data. However, CRC performed in this fashion occurs one bit at a time, which increases the number of cycles and latency involved.

To reduce the number of cycles, CRC can involve using lookup tables in parallel to obtain partial results for portions of the input data and performing XOR operations on the partial results to obtain a final result indicating whether there is an error. However, when the accumulator data bit size is greater than the input data bit size, CRC may not yield a correct result. Further, the bit reversal may place a burden on the design of error-checking hardware with back-and-forth wire reversal.

BRIEF SUMMARY

Aspects of the disclosure are directed to an error detection approach performed in a processing cycle with improved accuracy and reduced latency. The approach involves determining whether the size of a received input value is greater than, equal to, or less than the size of an accumulator value and performing the error detection accordingly using parallel lookup tables corresponding to portions of the input value. To avoid bit reversals in the error detection, results stored in the lookup tables may be stored in a bit reversed order. For input values that are less than the size of the accumulator value, the accumulator value is split into two or more portions to increase accuracy of the error detection result.

An aspect of the disclosure provides for a method for error detection including: receiving, by the one or more processors, an input value; determining, by the one or more processors, that a size of the input value is less than a size of the accumulator value; partitioning, by the one or more processors, the accumulator value into a first portion corresponding to the input value and a second portion corresponding to a remainder of the accumulator value; performing, by the one or more processors, a XOR operation on the input value and the first portion to generate an input XOR accumulator value; generating, by the one or more processors, a plurality of partial results from the input XOR accumulator value using a plurality of lookup tables; performing, by the one or more processors, XOR operations on pairs of the plurality of partial results until generating a subsequent partial result; and performing, by the one or more processors, a XOR operation on the subsequent partial result and the second portion to generate a final result to indicate whether there is an error in the input value.

Another aspect of the disclosure provides for a system including: one or more processors; and one or more storage devices coupled to the one or more processors and storing instructions that, when executed by the one or more processors, cause the one or more processors to perform operations for the method for error detection. Yet another aspect of the disclosure provides for a non-transitory computer readable medium for storing instructions that, when executed by one or more processors, cause the one or more processors to perform operations for the method for error detection. Yet another aspect of the disclosure provides for a computer program including instructions that, when executed by one or more processors, cause the one or more processors to perform operations for the method for error detection.

In an example, the method further includes extending, by the one or more processors, the input XOR accumulator value with a plurality of zeroes. In another example, the method further includes extending, by the one or more processors, the second portion with a plurality of zeros.

In yet another example, the plurality of lookup tables store the plurality of partial results in a bit-reversed order. In yet another example, the size of the input value and the size of the accumulator value are based on respective amounts of bits in the input value and the accumulator value.

In yet another example, generating the plurality of partial results further includes performing parallel error checking operations on portions of an output of a XOR operation performed on the input XOR accumulator value and a zero value.

In yet another example, the method further includes: receiving, by one or more processors, a second input value; determining, by the one or more processors, that a size of the second input value is greater than a size of the accumulator value; generating, by the one or more processors, a second plurality of partial results from the second input value and accumulator value using the plurality of lookup tables; and performing, by the one or more processors, XOR operations on pairs of the second plurality of partial results until generating a second final result indicating whether there is an error in the second input value. In yet another example, the method further includes extending, by the one or more processors, the accumulator value with a plurality of zeros.

In yet another example, the method further includes: receiving, by the one or more processors, a second input value; determining, by the one or more processors, that a size of the second input value is equal to a size of the accumulator value; performing, by the one or more processors, a XOR operation on the second input value and the accumulator value to generate a second input XOR accumulator value; generating, by the one or more processors, a second plurality of partial results from the second input XOR accumulator value using the plurality of lookup tables; and performing, by the one or more processors, XOR operations on pairs of the second plurality of partial results until generating a second final result indicating whether there is an error in the second input value. In yet another example, the method further includes extending, by the one or more processors, the second input XOR accumulator value with a plurality of zeroes.

In yet another example, the error detection is a cyclic redundancy check.

DETAILED DESCRIPTION

Figure 1:
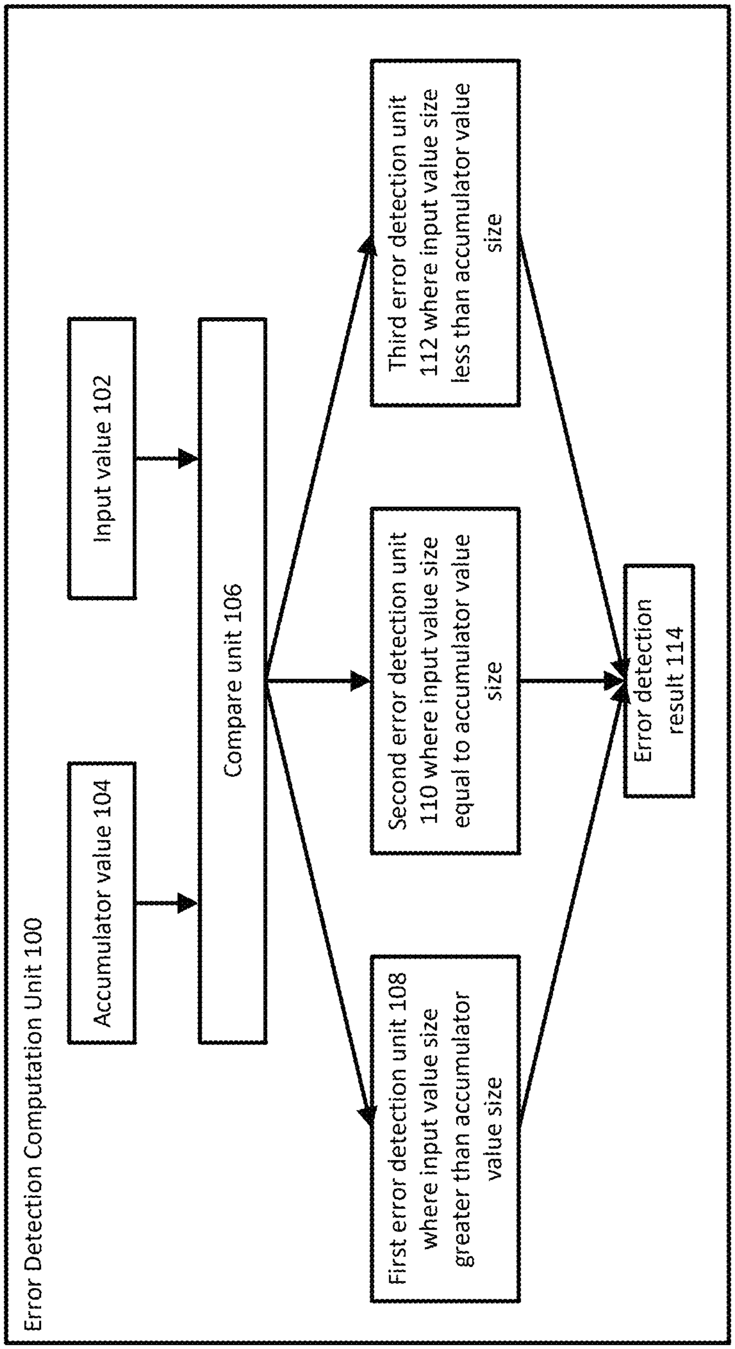
FIG. 1 depicts a block diagram of an example error detection computation unit implementing error detection according to aspects of the disclosure.

The technology relates generally to detecting errors in a processing cycle with improved accuracy and reduced latency. The error detection can be a cyclic redundancy check (CRC). The error detection can be performed in a processing cycle for any input data size compared to the accumulator data size. For example, the input data size can be 64 bits, 32 bits, 16 bits, or 8 bits while the accumulator data size can be 32 bits. Bit size refers to the number of binary digits in a bit string, e.g., a value 1001 has a bit size of 4. While described herein with respect to bits and bit size, aspects of this disclosure can be implemented using other forms of digital representation, such as bytes or multiple-byte units.

Control logic can determine whether the input data size is greater than, equal to, or less than the accumulator data size and perform error detection steps accordingly. For example, the control logic can receive an input value, compare the size of the input value to the size of an accumulator value, and proceed with one of multiple error detection processes based on whether the input value size is greater than, equal to, or less than the accumulator value size.

For error detection where the input data size is greater than the accumulator data size, e.g., 64-bit input and 32-bit accumulator, the error detection includes parallel lookup tables for different portions of the input value, after performing a XOR operation with a zero-extended accumulator to account for the input data size being greater than the accumulator data size. Zero extension refers to adding zeros to a value as either the most significant bits or least significant bits. The partial results from the lookup tables are reduced through a XOR reduction tree to generate the final result. To avoid bit reversal before and after the computations, the lookup tables may store the partial results in a bit-reversed order and index accordingly. For example, entry 0001 of a lookup table corresponding to the lower 4 bits holds a value corresponding to an error detection computation of 1000 in the upper 4 bits. In some examples, bit reversal is not needed before or after the computations, and so the lookup tables may store the partial results in their original order and index accordingly.

XOR is an example of an operator that may be implemented in software, hardware, or a combination of the two. Executing the XOR operation can determine the outcome of an exclusive disjunction between two operands. An exclusive disjunction resolves to true if and only if only one input is considered "true" while the other input is considered "false." Truth and falsity can be mapped to numerical values, e.g., a bit-value of one for true, and zero for false, or vice versa. The XOR operation may be represented in logic or circuit diagrams as $\oplus$. For example, $1\oplus0$ is 1 and $0\oplus1$ is 1, while $1\oplus1$ is 0 and $0\oplus0$ is 0. Results of the XOR operation for inputs of different sizes can be represented as truth tables. It is understood that while the XOR operation can be implemented according to a variety of different logically equivalent circuits for determining the outcome of an exclusive disjunction between two operands.

For error detection where the input data size is equal to the accumulator data size, e.g., 32-bit input and 32-bit accumulator, the error detection further includes performing a XOR operation between the input value and the accumulator value, extending a plurality of zeros in the lower bits of that result, and passing that result as input to the parallel lookup tables.

For error detection where the input data size is less than the accumulator data size, e.g., 16- or 8-bit input value and 32-bit accumulator value, the error detection further includes splitting up the accumulator value into two portions. For the bits of the accumulator value with corresponding input bits, the error detection calculates as if the sizes were equal using zero extension. For the remaining bits of the accumulator, the error detection performs a XOR operation with the upper result bits at the end.

For example, when the input value is 16 bits and the accumulator value is 32 bits, the error detection prepares a 64-bit intermediate input by performing a XOR operation on the 16-bit input with bits [15:0] of the accumulator value and appending the result with a lower 48 zero bits. The error detection as described previously with respect to the input data size being greater is then performed with the intermediate input as the input value and a 0 bit as the accumulator value. The upper 16 bits of this calculation are the upper 16 bits of the final result. For the lower 16 bits of the final result, the error detection performs a XOR operation on the lower 16 bits of the error detection described previously with bits [31:16] of the accumulator value.

As another example, when the input value is 8 bits and the accumulator value is 32 bits, the error detection prepares a 64-bit intermediate input by performing a XOR operation on the 8-bit input with bits [7:0] of the accumulator value and appending the result with a lower 56 zero bits. The error detection as described previously with respect to the input data size being greater is then performed with the intermediate input as the input value and a 0 bit as the accumulator value. The upper 8 bits of this calculation are the upper 8 bits of the final result. For the lower 24 bits of the final result, the error detection performs a XOR operation on the lower 24 bits of the error detection described previously with bits [31:8] of the accumulator value.

FIG. 1 depicts a block diagram of an example error detection computation unit 100. The computation unit 100 can be implemented on one or more computing devices in one or more locations using various data processing components, including registers, latches, flip-flops, comparators, multiplexers, etc. The computation unit 100 can be configured to perform cyclic redundancy checks (CRCs).

The computation unit 100 can be configured to receive an input value 102 to test for errors. The computation unit 100 can also generate the input value 102. The computation unit 100 can also receive and/or generate an accumulator value 104 to evaluate the input value 102 for detecting whether there are any errors. The accumulator value 104 can be an accumulated value from previous iterations of error detection performed by the computation unit 100.

The computation unit 100 can include a compare unit 106 configured to compare a bit size of the input value 102 to a bit size of the accumulator value 104 to determine how to perform error detection. The compare unit 106 can include control logic to determine whether the input value bit size is greater than, equal to, or less than the accumulator value bit size. For example, the compare unit 106 can include one or more comparators, multiplexers, and/or logic bits for comparing the input value bit size to the accumulator value bit size and determining how to accordingly perform error detection. In some examples, the compare unit 106 can receive signals or data indicating the size of the input value and the accumulator value and compare the received sizes for determining whether the input value bit size is greater than, equal to, or less than the accumulator value bit size. In some examples, the compare unit 106 can receive a predetermined indication of whether the input value bit size is greater than, equal to, or less than the accumulator value bit size, and forward the input value to the input value 102 to the corresponding unit as described herein.

The computation unit 100 can include a first error detection unit 108 configured to perform error detection when the input value bit size is greater than the accumulator value bit size, a second error detection unit 110 configured to perform error detection when the input value bit size is equal to the accumulator value bit size, and a third error detection unit 112 configured to perform error detection when the input value bit size is less than the accumulator value bit size. Generally, the error detection units 108-112 perform parallel error checking operations using lookup tables to generate partial results. The lookup tables can be bit-reversed lookup tables to remove bit reversal operations performed by the error detection units, thus reducing processing costs and memory usage. The error detection units 108-112 further perform XOR operations to combine the partial results into an error detection result 114 for detecting error in the input value 102. For example, the error detection result 114 can be one or more bits, where a 1-bit indicates there is an error in the input value 102 while 0-bit indicates there is no error in the input value 102. While depicted as three separate detection units in FIG. 1, one or more of the error detections units 108-112 can be combined into a single detection unit and/or reuse data processing components within the detection units to reduce the number of data processing components needed to perform error detection. For example, the error detection units 108-112 can be configured with the same lookup tables.

Figure 2:
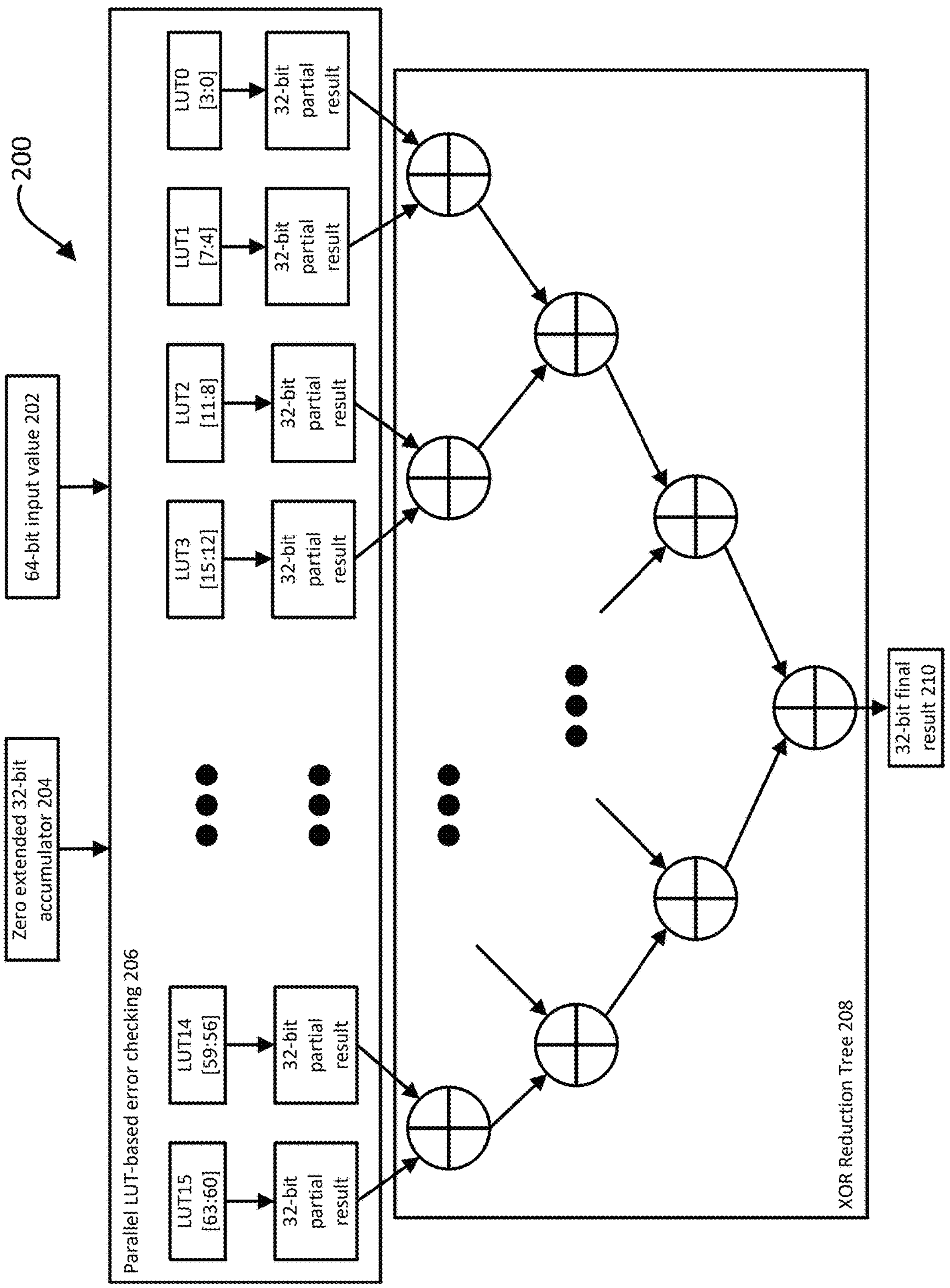
FIG. 2 depicts a block diagram of example error detection when the input value is greater than the accumulator value according to aspects of the disclosure.

FIG. 2 depicts a block diagram of an example error detection unit 200 for performing error detection when the input value bit size is greater than the accumulator value bit size. The error detection unit 200 can correspond to the error detection unit 108 as depicted in FIG. 1. As depicted in FIG. 2, the accumulator value has a bit size of 32 and the input value has a bit size of 64, though this is not intended to be limiting, as the accumulator values and input values can have any bit size as long as the input value bit size is greater than the accumulator value bit size.

The error detection unit 200 receives an input value 202 and a zero-extended accumulator value 204. The error detection unit 200 can perform the zero extension by adding zeros as the most significant bits or least significant bits of the accumulator value until the bit size of the accumulator value matches the bit size of the input value 202. The error detection unit 200 can alternatively, or additionally, receive the zero-extended accumulator value 204.

The error detection unit 200 includes a parallel lookup table based error checking unit 206 and a XOR reduction tree 208. The parallel lookup table based error checking unit 206 can include a XOR operation performed on zero-extended accumulator value 204 and input value 202 to generate an input XOR accumulator value. The parallel lookup table based error checking unit 206 can further include a plurality of lookup tables that store potential partial error checking results of the input XOR accumulator value. The error checking can be partial CRC operations and the partial results can be partial CRC results. 16 lookup tables are depicted in FIG. 2 for partitioning the error checking operation into parallel processing 4 bits of the 64-bit values, though the lookup table based error checking unit 206 can include any number of lookup tables depending on the size of the input value 202 and how many bits can be parallel processed. The lookup tables may be bit-reversed lookup tables that store the partial results in a bit-reversed order and index accordingly. For example, entry 0001 of a bit-reversed lookup table corresponding to the lower 4 bits holds a value corresponding to an error detection computation of 1000 in the upper 4 bits. The lookup tables store partial error checking results that map to portions of the input XOR accumulator value. As an example, the partial results can each be 32 bits to match the bit size of the accumulator value.

The XOR reduction tree 208 includes a plurality of XOR operations to reduce the plurality of partial results into a final result 210 for indicating whether there is an error in the input value. As an example, the final result can be 32 bits to match the bit size of the accumulator value. The XOR reduction tree 208 can iteratively perform XOR operations on pairs of the plurality of partial results until a single result remains representing the final result 210. As depicted in FIG. 2, the XOR reduction tree 208 includes four rows of XOR operations. The first row includes 8 XOR operations to perform on the 8 pairs of the 16 partial results from the 16 lookup tables. The second row includes 4 XOR operations to perform on the 4 pairs of 8 subsequent results from the 8 XOR operations. The third row includes 2 XOR operations to perform on the 2 pairs of 4 subsequent results from the 4 XOR operations. The fourth row includes a single XOR operation to perform on the last pair of 2 subsequent results from the 2 XOR operations to generate the final result 210. The XOR reduction tree 208 can include any number of rows of XOR operations and any number of XOR operations within those rows depending on the bit size of the input value 202 and bit size of the partial results.

Figure 3:
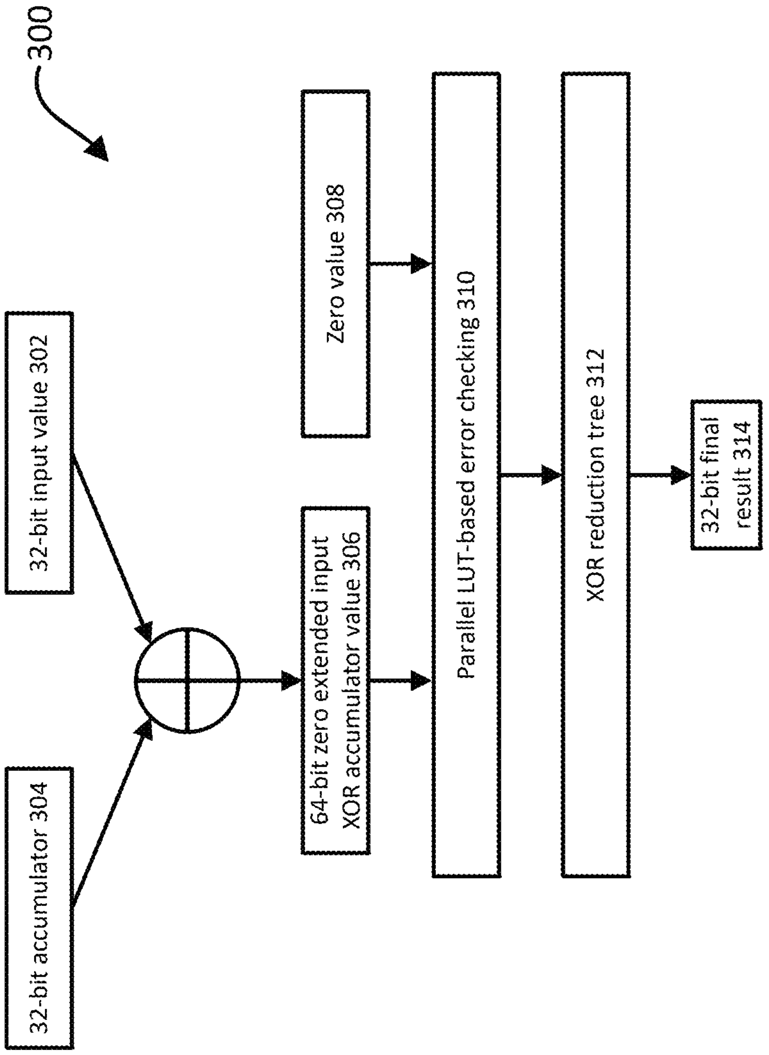
FIG. 3 depicts a block diagram of example error detection when the input value is equal to the accumulator value according to aspects of the disclosure.

FIG. 3 depicts a block diagram of an example error detection unit 300 for performing error detection when the input value bit size is equal to the accumulator value bit size. The error detection unit 300 can correspond to the error detection unit 110 as depicted in FIG. 1. As depicted in FIG. 3, the accumulator value has a bit size of 32 and the input value has a bit size of 32, though this is not intended to be limiting, as the accumulator values and input values can have any bit size as long as their bit size is equal.

The error detection unit 300 receives an input value 302 and an accumulator value 304. The error detection unit 300 performs a XOR operation on the input value 302 and accumulator value 304 to generate an input XOR accumulator value. The error detection unit 300 can perform a zero extension on the input XOR accumulator value to generate a zero extended input XOR accumulator value 306, such as by adding zeros as the most significant bits or least significant bits of the input XOR accumulator value. For example, the zero extended input XOR accumulator value 306 can have a size of 64 bits.

The error detection unit 300 includes a parallel lookup table based error checking unit 310 and a XOR reduction tree 312. The lookup table based error checking unit 310 and XOR reduction tree 312 can correspond to the lookup table based error checking unit 206 and XOR reduction tree 208 as depicted in FIG. 2 and perform in a similar manner. As examples, the lookup table based error checking unit 310 and XOR reduction tree 312 can be the lookup table based error checking unit 206 and XOR reduction tree 208 and/or use the same data processing components to save circuit space.

Rather than receiving an input value and an accumulator value, the lookup table based error checking unit 310 receives the zero extended input XOR accumulator value 306 and a zero value 308. The zero value 308 refers to a bit string of zeros having the same bit size as the zero extended input XOR accumulator value. For example, if the zero extended input XOR accumulator value has a bit size of 64, then the zero value is a bit string of 64 zeros. As described with respect to FIG. 2, the lookup table based error checking unit 310 generates a plurality of partial results and the XOR reduction tree 312 performs XOR operations to reduce the plurality of partial results to a final result 314 for indicating whether there is an error in the input value. The final result 314 can be 32 bits to match the bit size of the accumulator value 304, as an example.

Figure 4:
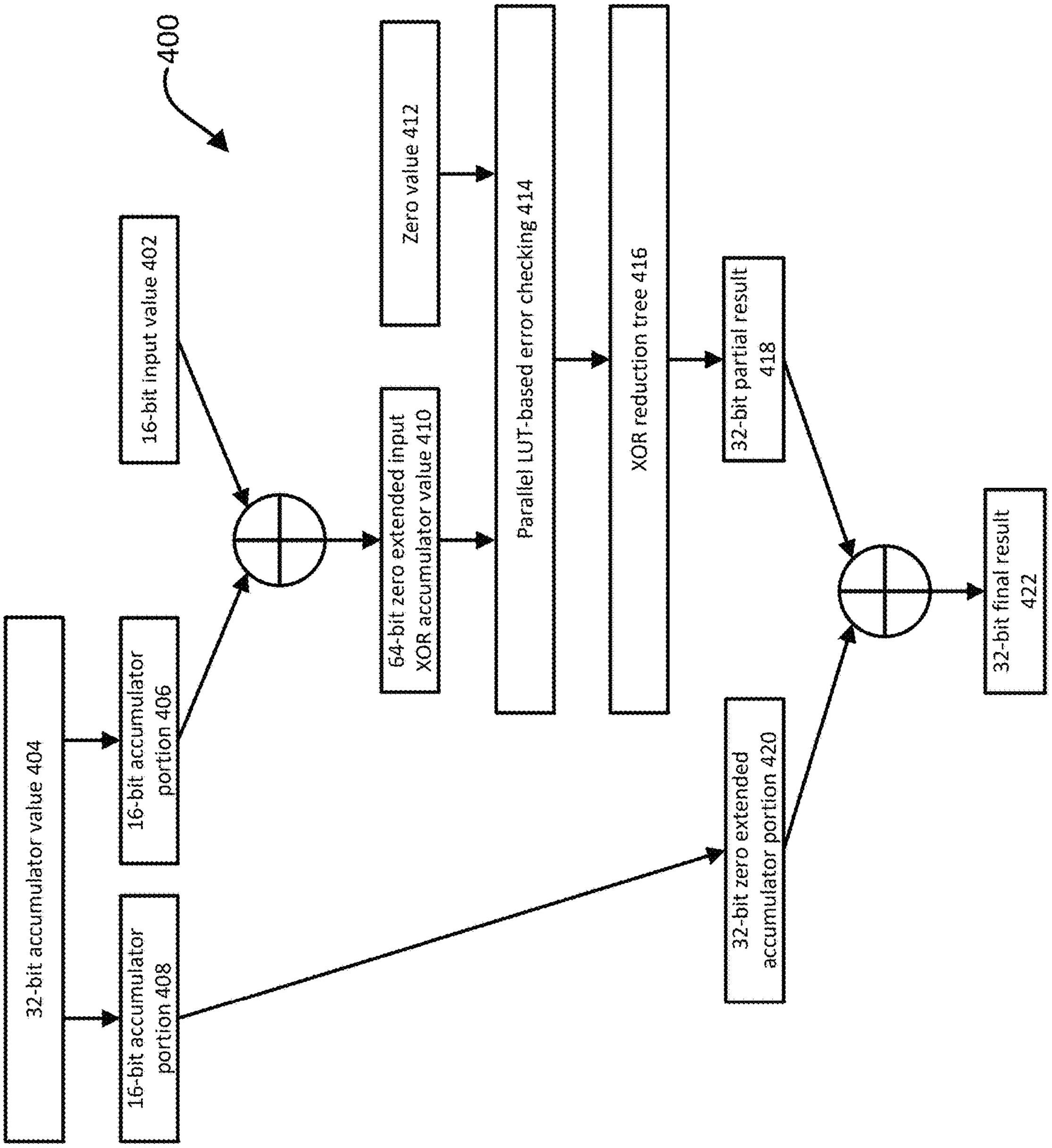
FIG. 4 depicts a block diagram of example error detection when the input value is less than the accumulator value according to aspects of the disclosure.

FIG. 4 depicts a block diagram of an example error detection unit 400 for performing error detection when the input value bit size is less than the accumulator value bit size. The error detection unit 400 can correspond to the error detection unit 112 as depicted in FIG. 1. As depicted in FIG. 4, the accumulator value has a bit size of 32 and the input value has a bit size of 16, though this is not intended to be limiting, as the accumulator values and input values can have any bit size as long as the input value bit size is less than the accumulator value bit size.

The error detection unit 400 receives an input value 402 and an accumulator value 404. The error detection unit 400 divides the accumulator value 404 into a first portion 406 and a second portion 408. The first portion 406 corresponds to the lower bits up to the size of the input value 402. For example, the first portion bit size is 16 bits and can correspond to bits [15:0] of the accumulator value if the input value bit size is 16 bits. As another example, the first portion bit size is 8 bits and can correspond to bits [7:0] of the accumulator value if the input value bit size is 8 bits. The second portion 408 corresponds to the remaining bits of the accumulator value 404. For example, the second portion bit size is 24 bits and can correspond to bits [31:8] of the accumulator value if the input value bit size is 8 bits. As depicted in FIG. 4, the first portion 406 is 16 bits and the second portion 408 is also 16 bits to correspond to the 16 bit size of the input value 402.

The error detection unit 400 performs a XOR operation on the input value 402 and the first portion 406 to generate an input XOR accumulator value. The error detection unit 400 can perform a zero extension on the input XOR accumulator value to generate a zero extended input XOR accumulator value 410, such as by adding zeros as the most significant bits or least significant bits of the input XOR accumulator value. For example, the zero extended input XOR accumulator value 410 can have a size of 64 bits.

The error detection unit 400 includes a parallel lookup table based error checking unit 414 and a XOR reduction tree 416. As with FIG. 3, the lookup table based error checking unit 414 and XOR reduction tree 416 can correspond to the lookup table based XOR unit 206 and XOR reduction tree 208 as depicted in FIG. 2 and perform in a similar manner. As examples, the lookup table based error checking unit 414 and XOR reduction tree 416 can be the lookup table based error checking unit 206 and XOR reduction tree 208 and/or use the same data processing components to save circuit space.

As with FIG. 3, the lookup table (LUT) based error checking unit 414 receives the zero extended input XOR accumulator value 410 and a zero value 412. As described with respect to FIG. 2, the lookup table based error checking unit 414 generates a plurality of partial results and the XOR reduction tree 416 performs XOR operations to reduce the plurality of partial results to a subsequent partial result 418. The subsequent partial result 418 can be 32 bits to match the bit size of the accumulator value 404, as an example.

The error detection unit 400 performs a XOR operation on the subsequent partial result 418 and a zero extended second portion 420 of the accumulator value 404. The zero extended second portion 420 can be the second portion 408 with zeros added to the most significant bits or least significant bits to match the bit size of the subsequent partial result 418. The XOR operation generates the final result 422 for indicating whether there is an error in the input value 402. The final result 422 can be 32 bits to match the bit size of the accumulator value 404, as an example.

Figure 5:
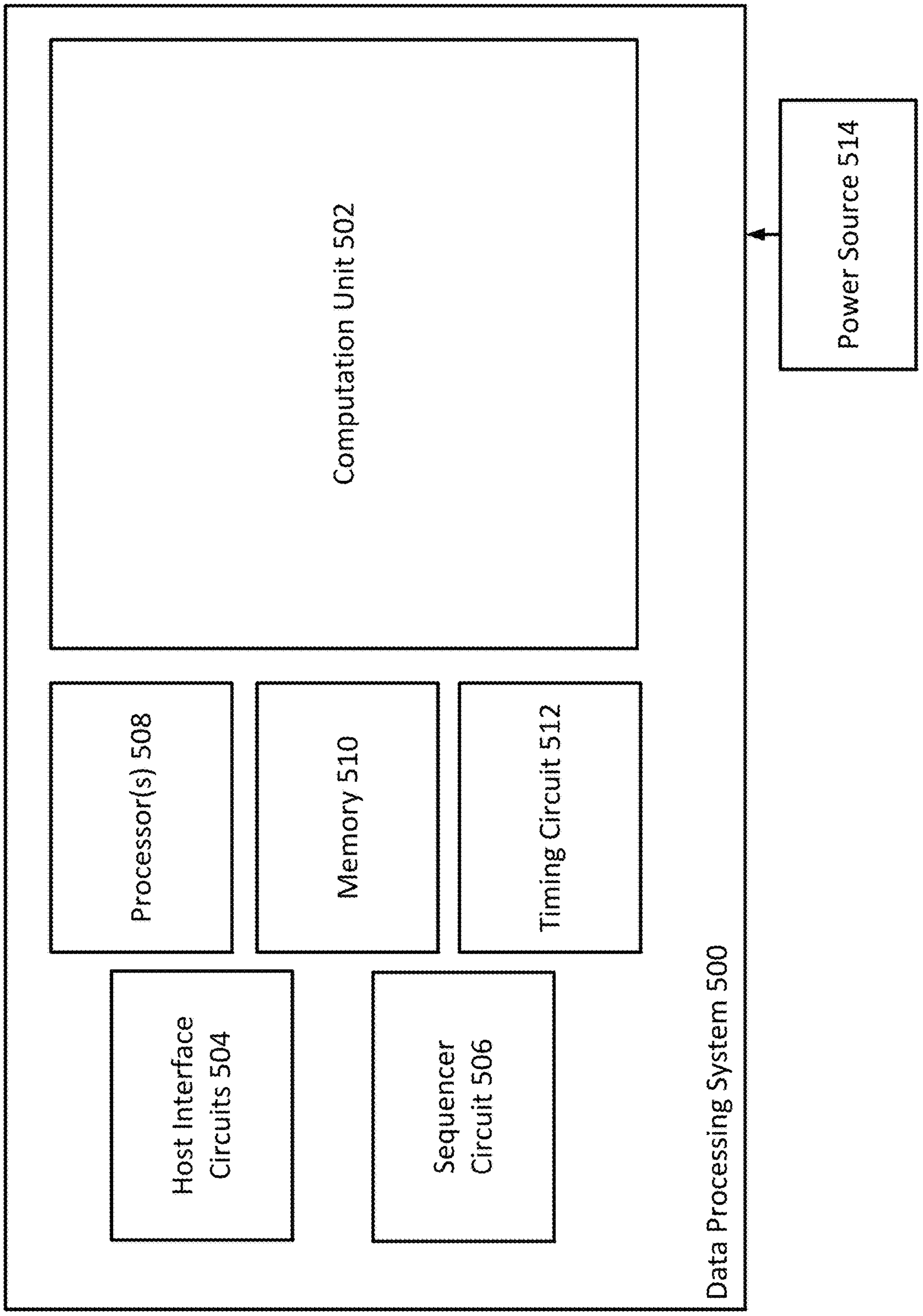
FIG. 5 depicts a block diagram of an example data processing system implementing a computation unit according to aspects of the disclosure.

FIG. 5 depicts a block diagram of a data processing system 500 implementing an example computation unit 502. The computation unit 502 can correspond to the error detection computation unit 100 as depicted in FIG. 1.

The data processing system 500 can include a host interface 504, a sequencer circuit 506, one or more processors 508, memory 510, and a timing circuit 512. The data processing system 500 can be implemented in one or more devices across one or more physical locations, as described further with respect to FIG. 6. In some examples, the components of the data processing system 500 can be implemented on one or more chips, which can interface with a host device according to any of a variety of data bus or other physical interconnect interfaces. In some examples, the data processing system 500 can be implemented on one or more devices on a network, e.g., on one or more servers of a cloud platform. For example, the data processing system 500 can be implemented as part of a network device, for automatically performing error checking on data transmitted by or received from the network device.

Figure 6:
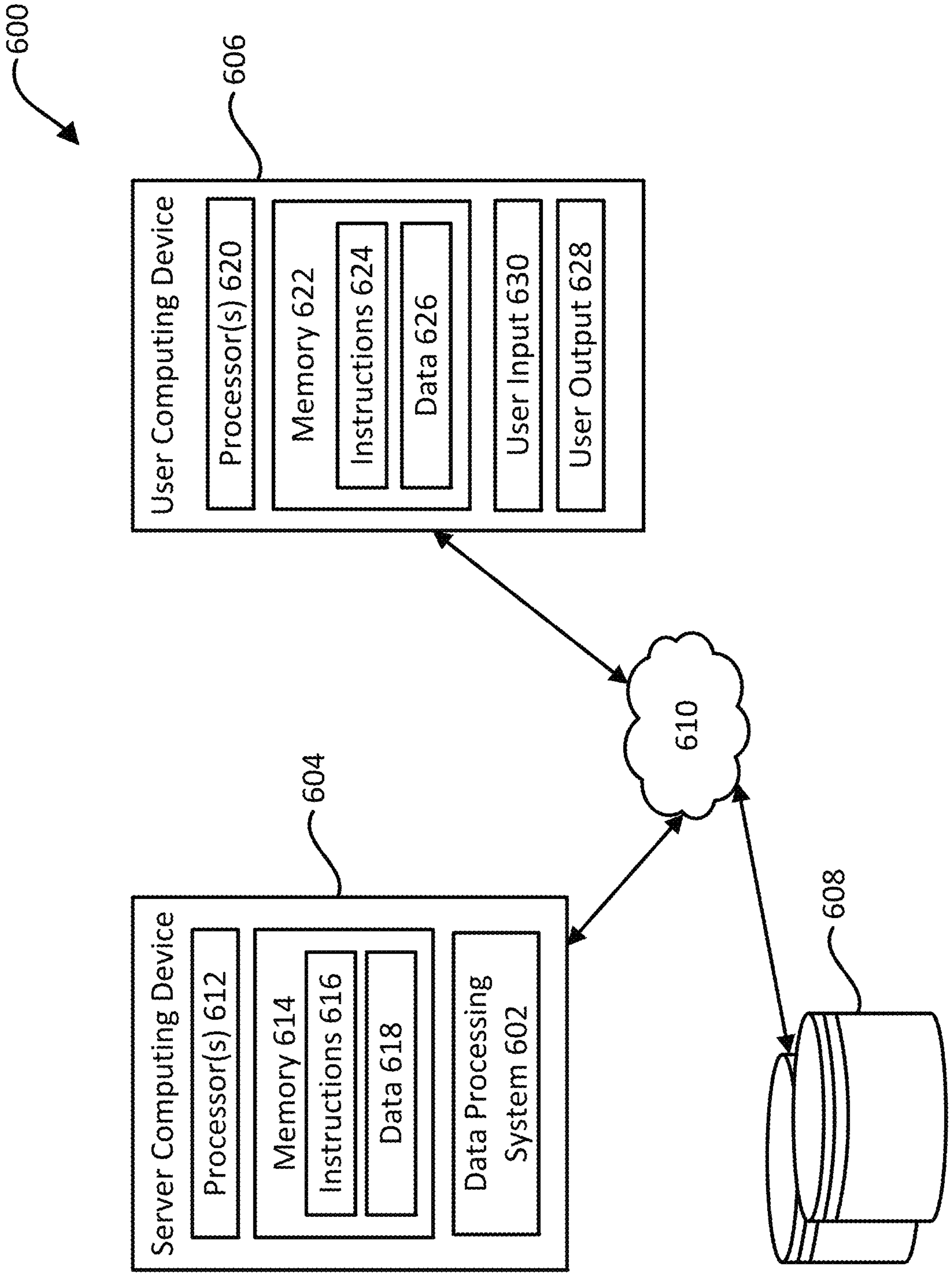
FIG. 6 depicts a block diagram of an example environment for implementing a data processing system including a computation unit according to aspects of the disclosure.

The processors 508 and memory 510 can be any of a variety of different types of processors and memory as described further with reference to FIG. 6. In some examples, the processors 508 receive instructions that are executable by the computation unit 502 for processing data. The instructions can be part of a computer program written for detecting errors using the computation unit 502.

The sequencer circuit 506 can convert the received instructions into one or more signals understood by the computation unit 502 which causes the computation unit 502 to perform any of a variety of error detection operations, such as the operations described with respect to FIGS. 2-4. The sequencer circuit 506 can also be configured to generate one or more control signals for controlling when instructions are pushed to the computation unit 502.

The host interface 504 can be configured to receive data from outside the data processing system 500, e.g., from one or more processors or other devices, and send data generated by the computation unit 502, e.g., an error detection result, to outside the data processing system 500, e.g., to one or more processors or other devices.

The timing circuit 512 can be configured to control timing of the computation unit 502, e.g., its clock frequency or clock rate. For example, operations performed by the computation unit 502 may be performed once per clock cycle, with such clock cycles managed by the timing circuit 512.

The data processing system 500 can also be connected to a power source 514. The power source 514 can be a battery or other form of power available on a host device implementing the data processing system 500 or can be a source external to the host device and connected to the host device and the data processing system 500 through some wireless or physical connection, e.g., through wires. The power source 514 can supply voltage to the computation unit 502, which can be managed, e.g., adjusted higher or lower, by the processors 508.

FIG. 6 depicts a block diagram of an example environment 600 for implementing a data processing system 602 including an error detection computation unit. The data processing system 602 can correspond to the data processing system 500 as depicted in FIG. 5. The data processing system 602 can be implemented on one or more devices having one or more processors in one or more locations, such as in server computing device 604. User computing device 606 and the server computing device 604 can be communicatively coupled to one or more storage devices 608 over a network 610. The storage devices 608 can be a combination of volatile and non-volatile memory and can be at the same or different physical locations than the computing devices 604, 606. For example, the storage devices 608 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 604 can include one or more processors 612 and memory 614. The memory 614 can store information accessible by the processors 612, including instructions 616 that can be executed by the processors 612. The memory 614 can also include data 618 that can be retrieved, manipulated, or stored by the processors 612. The memory 614 can be a type of non-transitory computer readable medium capable of storing information accessible by the processors 612, such as volatile and non-volatile memory. The processors 612 can include one or more central processing units (CPUs), graphic processing units (GPUs), field-programmable gate arrays (FPGAs), and/or application-specific integrated circuits (ASICs), such as tensor processing units (TPUs).

The instructions 616 can include one or more instructions that when executed by the processors 612, causes the one or more processors 612 to perform actions defined by the instructions 616. The instructions 616 can be stored in object code format for direct processing by the processors 612, or in other formats including interpretable scripts or collections of independent source code modules that are interpreted on demand or compiled in advance. The instructions 616 can include instructions for implementing the data processing system 602 for error detection as described herein. The data processing system 602 can be executed using the processors 612, and/or using other processors remotely located from the server computing device 604.

The data 618 can be retrieved, stored, or modified by the processors 612 in accordance with the instructions 616. The data 618 can be stored in computer registers, in a relational or non-relational database as a table having a plurality of different fields and records, or as JSON, YAML, proto, or XML documents. The data 618 can also be formatted in a computer-readable format such as, but not limited to, binary values, ASCII or Unicode. Moreover, the data 618 can include information sufficient to identify relevant information, such as numbers, descriptive text, proprietary codes, pointers, references to data stored in other memories, including other network locations, or information that is used by a function to calculate relevant data.

The user computing device 606 can also be configured similarly to the server computing device 604, with one or more processors 620, memory 622, instructions 624, and data 626. The user computing device 606 can also include a user output 628 and a user input 630. The user input 630 can include any appropriate mechanism or technique for receiving input from a user, such as keyboard, mouse, mechanical actuators, soft actuators, touchscreens, microphones, and sensors.

The server computing device 604 can be configured to transmit data to the user computing device 606, and the user computing device 606 can be configured to display at least a portion of the received data on a display implemented as part of the user output 628. The user output 628 can also be used for displaying an interface between the user computing device 606 and the server computing device 604. The user output 628 can alternatively or additionally include one or more speakers, transducers or other audio outputs, a haptic interface or other tactile feedback that provides non-visual and non-audible information to the platform user of the user computing device 606.

Although FIG. 6 illustrates the processors 612, 620 and the memories 614, 622 as being within the computing devices 604, 606, components described herein can include multiple processors and memories that can operate in different physical locations and not within the same computing device. For example, the processors 612 can include a collection of processors that can perform concurrent and/or sequential operation.

The server computing device 604 can be configured to receive requests to process data from the user computing device 606. For example, the environment 600 can be part of a computing platform configured to provide a variety of services to users, through various user interfaces and/or APIs exposing the platform services. The services can include error detection. The user computing device 606 may receive and transmit data specifying operations to be performed by the computation unit of the data processing system 602.

The computing devices 604, 606 can be capable of direct and indirect communication over the network 610. The computing devices 604, 606 can set up listening sockets that may accept an initiating connection for sending and receiving information. The network 610 itself can include various configurations and protocols including the Internet, World Wide Web, intranets, virtual private networks, wide area networks, local networks, and private networks using communication protocols proprietary to one or more companies. The network 610 can support a variety of short-and long-range connections. The short-and long-range connections may be made over different bandwidths, such as 2.402 GHz to 2.480 GHz (commonly associated with the Bluetooth® standard), 2.4 GHz and 11 GHz (commonly associated with the Wi-Fi® communication protocol); or with a variety of communication standards, such as the LTE® standard for wireless broadband communication. The network 610, in addition or alternatively, can also support wired connections between the computing devices 604, 606, including over various types of Ethernet connection.

Although a single server computing device 604, user computing device 606, and data processing system 602 are shown in FIG. 6, it is understood that aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof. In some examples, one or more devices implement one or more data processing systems, each data processing system including one or more computation units according to aspects of the disclosure. In some examples, a single device can implement multiple computation units, each of the multiple computation units configured to communicate with at least one other computation unit for performing a distributed data processing task, e.g., in sequential or parallel processing.

Figure 7:
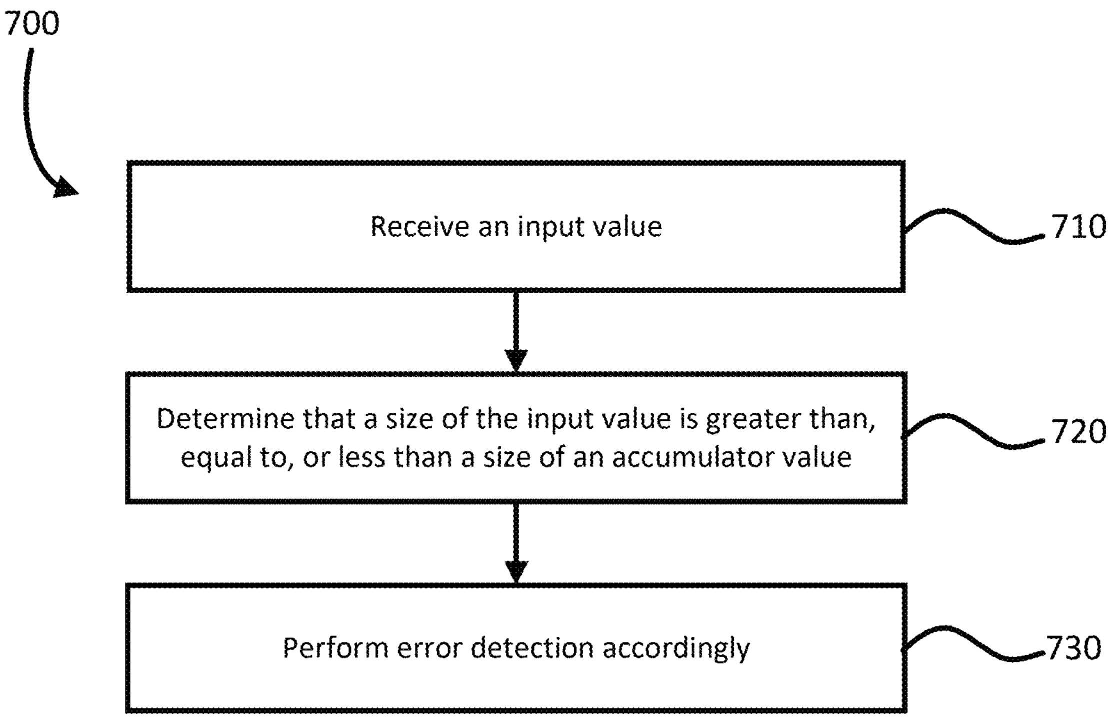
FIG. 7 depicts a flow diagram of an example process for error detection according to aspects of the disclosure.

FIG. 7 depicts a flow diagram of an example process 700 for error detection. The error detection can be CRC. The example process 700 can be performed on a system with one or more processors in one or more locations, such as the error detection computation unit 100 as depicted in FIG. 1.

As shown in block 710, the computation unit 100 receives an input value. Receiving the input value can include generating the input value. The computation unit 100 can further receive an accumulator value for evaluating whether the input value contains any errors. Receiving the accumulator value can include generating the accumulator value. The input value can be any bit size, e.g., 8, 16, 32, or 64, and the accumulator value can be a predetermined bit size, e.g., 32.

As shown in block 720, the computation unit 100 determines that a bit size of the input value is greater than, equal to, or less than a bit size of the accumulator value. The computation unit 100 can compare the bit size of the input value to the bit size of the accumulator value using control logic.

As shown in block 730, the computation unit 100 performs error detection accordingly based on whether the bit size of the input value is greater than, equal to, or less than the bit size of the accumulator value. The computation unit 100 can perform error detection using a parallel lookup table based XOR operation and a XOR reduction tree to generate an error detection result indicating whether there is an error in the input value. The lookup tables can store partial results for the XOR operation in a bit-reversed order.

Figure 8:
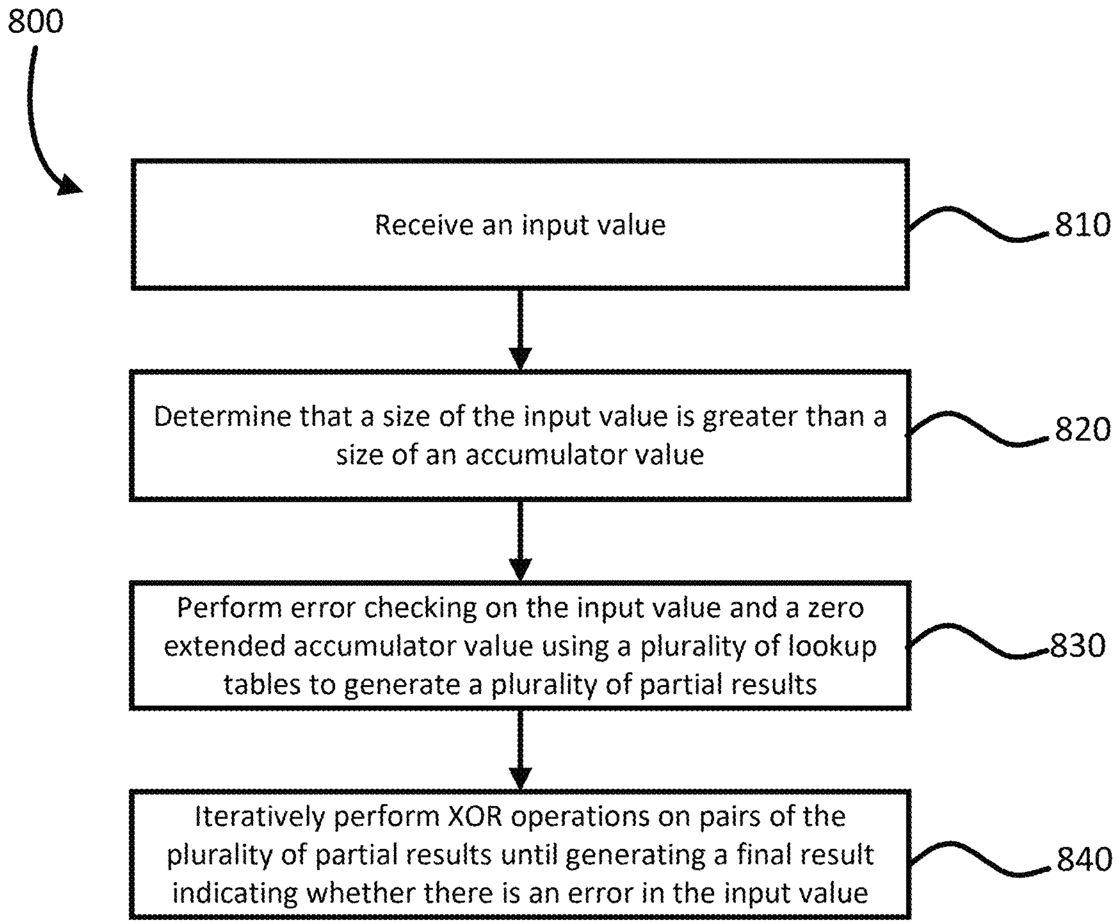
FIG. 8 depicts a flow diagram of an example process for error detection when the input value is greater than the accumulator value according to aspects of the disclosure.

FIG. 8 depicts a flow diagram of an example process 800 for error detection when the input value is greater than the accumulator value, e.g., input value bit size is 64 and accumulator value bit size is 32. The example process 800 can be performed on a system with one or more processors in one or more locations, such as the error detection computation unit 100 as depicted in FIG. 1.

As shown in block 810, the computation unit 100 receives an input value. The computation unit 100 can further receive an accumulator value.

As shown in block 820, the computation unit 100 determines that a bit size of the input value is greater than a bit size of the accumulator value. The computation unit 100 can compare the bit size of the input value to the bit size of the accumulator value using control logic.

As shown in block 830, the computation unit 100 performs error checking on the input value and a zero extended accumulator value using a plurality of lookup tables to generate a plurality of partial results. The zero extended accumulator value can refer to the accumulator value with zeros added to the most significant or least significant bits to match the size of the input value. The plurality of lookup tables can store the plurality of partial results in a bit-reversed order. The plurality of partial results map to portions of the output of a XOR operation performed on the input value and the accumulator value. The computation unit 100 can generate the plurality of partial results in parallel.

As shown in block 840, the computation unit 100 iteratively performs XOR operations on pairs of the plurality of partial results until generating a final result indicating whether there is an error in the input value. The computation unit 100 can iteratively perform XOR operations in parallel to reduce the plurality of partial results into the final result.

Figure 9:
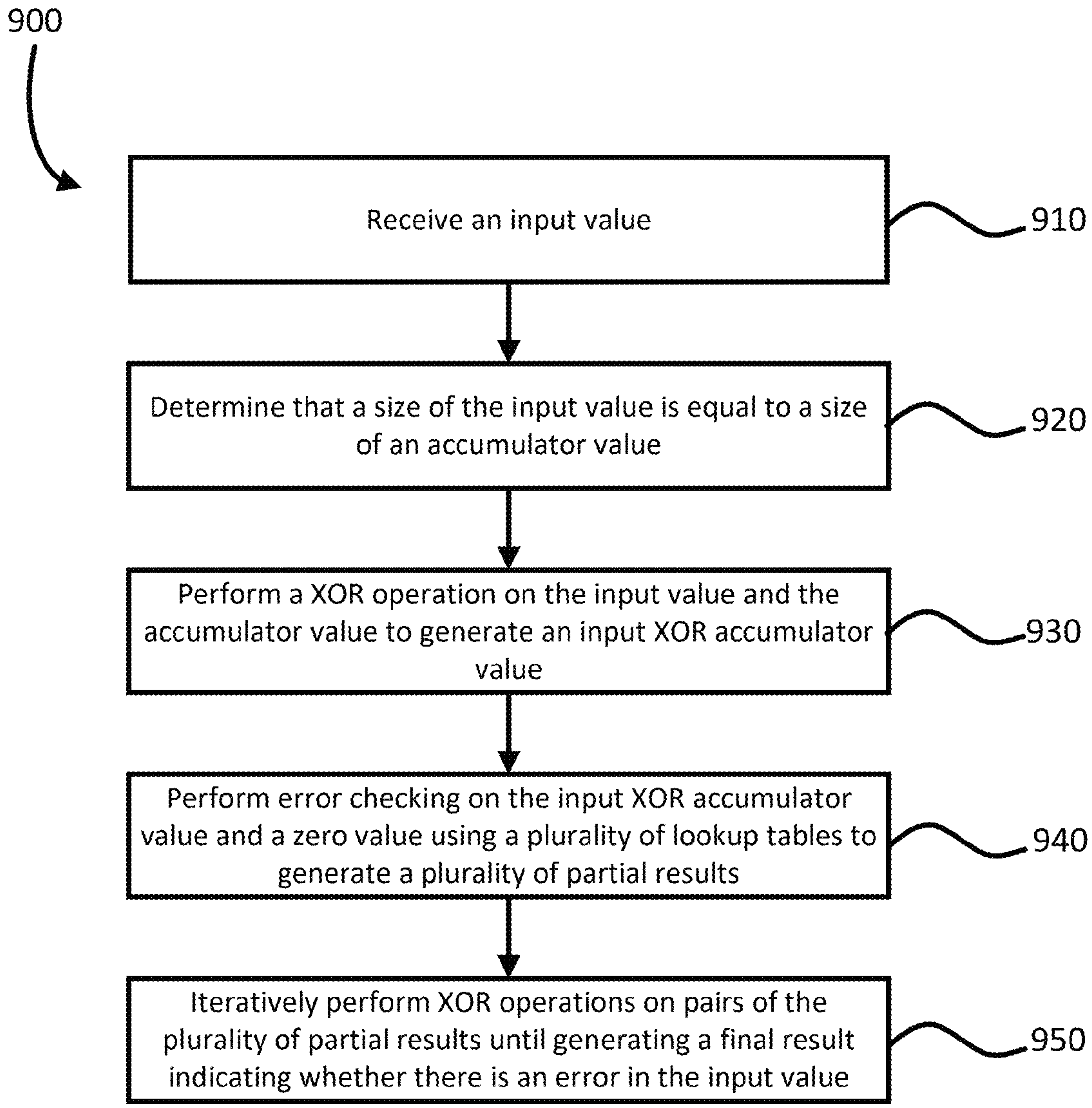
FIG. 9 depicts a flow diagram of an example process for error detection when the input value is equal to the accumulator value according to aspects of the disclosure.

FIG. 9 depicts a flow diagram of an example process 900 for error detection when the input value is equal to the accumulator value, e.g., input value bit size is 32 and accumulator value bit size is 32. The example process 900 can be performed on a system with one or more processors in one or more locations, such as the error detection computation unit 100 as depicted in FIG. 1.

As shown in block 910, the computation unit 100 receives an input value. The computation unit 100 can further receive an accumulator value.

As shown in block 920, the computation unit 100 determines that a bit size of the input value is equal to a bit size of the accumulator value. The computation unit 100 can compare the bit size of the input value to the bit size of the accumulator value using control logic.

As shown in block 930, the computation unit 100 performs a XOR operation on the input value and the accumulator value to generate an input XOR accumulator value. The input XOR accumulator value can be extended with zeros. For example, the input XOR accumulator value can be extended with zeros to have a bit size of 64 bits.

As shown in block 940, the computation unit 100 performs error checking on the input XOR accumulator value and a zero value using a plurality of lookup tables to generate a plurality of partial results. The plurality of lookup tables can store the plurality of partial results in a bit-reversed order. The computation unit 100 can generate the plurality of partial results in parallel.

As shown in block 950, the computation unit 100 iteratively performs XOR operations on pairs of the plurality of partial results until generating a final result indicating whether there is an error in the input value. The computation unit 100 can iteratively perform XOR operations in parallel to reduce the plurality of partial results into the final result.

Figure 10:
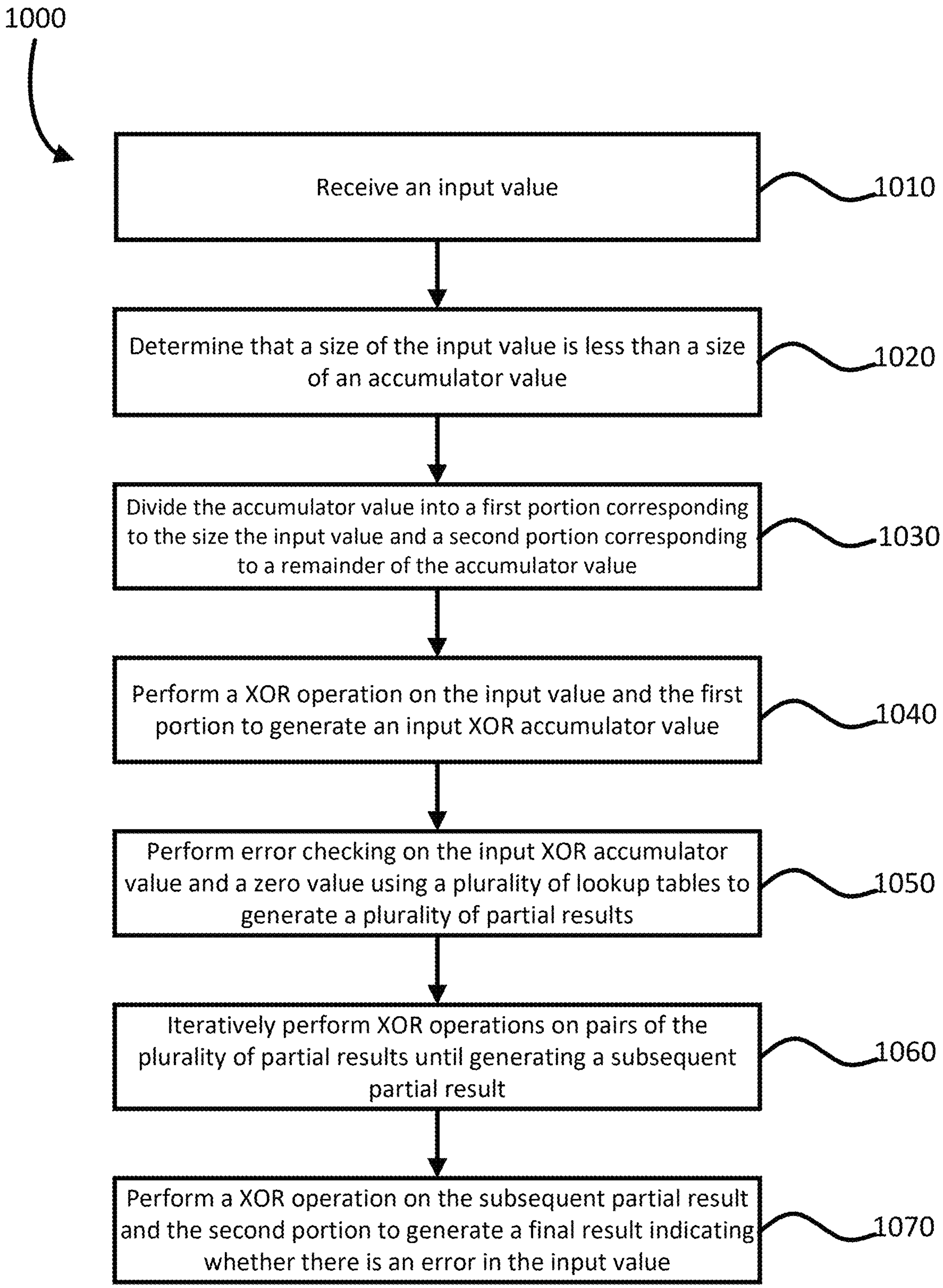
FIG. 10 depicts a flow diagram of an example process for error detection when the input value is less than the accumulator value according to aspects of the disclosure.

FIG. 10 depicts a flow diagram of an example process 1000 for error detection when the input value is less than the accumulator value, e.g., input value bit size is 16 and accumulator value bit size is 32. The example process 1000 can be performed on a system with one or more processors in one or more locations, such as the error detection computation unit 100 as depicted in FIG. 1.

As shown in block 1010, the computation unit 100 receives an input value. The computation unit 100 can further receive an accumulator value.

As shown in block 1020, the computation unit 100 determines that a bit size of the input value is less than a bit size of the accumulator value. The computation unit 100 can compare the bit size of the input value to the bit size of the accumulator value using control logic.

As shown in block 1030, the computation unit 100 divides the accumulator value into a first portion corresponding to the size of the input value and a second portion corresponding to a reminder of the accumulator value. The first portion can correspond to the lower bits of the accumulator value up to the size of the input value and the second portion can correspond to the remaining bits of the accumulator value.

As shown in block 1040, the computation unit 100 performs a XOR operation on the input value and the first portion to generate an input XOR accumulator value. The input XOR accumulator value can be extended with zeros. For example, the input XOR accumulator value can be extended with zeros to have a bit size of 64 bits.

As shown in block 1050, the computation unit 100 performs error checking on the input XOR accumulator value and a zero value using a plurality of lookup tables to generate a plurality of partial results. The plurality of lookup tables can store the plurality of partial results in a bit-reversed order. The computation unit 100 can generate the plurality of partial results in parallel.

As shown in block 1060, the computation unit 100 iteratively performs XOR operations on pairs of the plurality of partial results until generating a subsequent partial result. The computation unit 100 can iteratively perform XOR operations in parallel to reduce the plurality of partial results into the subsequent partial result.

As shown in block 1070, the computation unit 100 performs a XOR operation on the subsequent partial result and the second portion to generate a final result indicating whether there is an error in the input value.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for error detection comprising:

receiving, by one or more processors, an input value and an accumulator value for detecting errors in the input value;

determining, by the one or more processors, that a size of the input value is less than a size of the accumulator value;

partitioning, by the one or more processors, the accumulator value into a first portion corresponding to the input value and a second portion corresponding to a remainder of the accumulator value;

performing, by the one or more processors, a XOR operation on the input value and the first portion to generate an input XOR accumulator value;

generating, by the one or more processors, a plurality of partial results from the input XOR accumulator value using a plurality of lookup tables;

performing, by the one or more processors, XOR operations on pairs of the plurality of partial results to generate a subsequent partial result; and performing, by the one or more processors, a XOR operation on the subsequent partial result and the second portion to generate a final result to indicate whether there is an error in the input value.

2. The method of claim 1, further comprising extending, by the one or more processors, the input XOR accumulator value with a plurality of zeroes.

3. The method of claim 1, wherein the plurality of lookup tables store the plurality of partial results in a bit-reversed order.

4. The method of claim 1, wherein the size of the input value and the size of the accumulator value are based on respective amounts of bits in the input value and the accumulator value.

5. The method of claim 1, wherein generating the plurality of partial results further comprises performing parallel error checking operations on portions of an output of a XOR operation performed on the input XOR accumulator value and a zero value.

6. The method of claim 1, further comprising extending, by the one or more processors, the second portion with a plurality of zeros.

7. The method of claim 1, further comprising:

receiving, by one or more processors, a second input value;

determining, by the one or more processors, that a size of the second input value is greater than a size of the accumulator value;

generating, by the one or more processors, a second plurality of partial results from the second input value and accumulator value using the plurality of lookup tables; and performing, by the one or more processors, XOR operations on pairs of the second plurality of partial results to generate a second final result indicating whether there is an error in the second input value.

8. The method of claim 7, further comprising extending, by the one or more processors, the accumulator value with a plurality of zeros.

9. The method of claim 1, further comprising:

receiving, by the one or more processors, a second input value;

determining, by the one or more processors, that a size of the second input value is equal to a size of the accumulator value;

performing, by the one or more processors, a XOR operation on the second input value and the accumulator value to generate a second input XOR accumulator value;

generating, by the one or more processors, a second plurality of partial results from the second input XOR accumulator value using the plurality of lookup tables; and performing, by the one or more processors, XOR operations on pairs of the second plurality of partial results to generate a second final result indicating whether there is an error in the second input value.

10. The method of claim 9, further comprising extending, by the one or more processors, the second input XOR accumulator value with a plurality of zeroes.

11. The method of claim 1, wherein the error detection is a cyclic redundancy check.

12. A system comprising:

one or more processors; and one or more storage devices coupled to the one or more processors and storing instructions that, when executed by the one or more processors, cause the one or more processors to perform operations for error detection, the operations comprising:

receiving an input value and an accumulator value for detecting errors in the input value;

determining that a size of the input value is less than a size of the accumulator value;

partitioning the accumulator value into a first portion corresponding to the input value and a second portion corresponding to a remainder of the accumulator value;

performing a XOR operation on the input value and the first portion to generate an input XOR accumulator value;

generating a plurality of partial results from the input XOR accumulator value using a plurality of lookup tables;

performing XOR operations on pairs of the plurality of partial results to generate a subsequent partial result; and performing a XOR operation on the subsequent partial result and the second portion to generate a final result to indicate whether there is an error in the input value.

13. The system of claim 12, wherein the operations further comprise extending the input XOR accumulator value with a plurality of zeroes.

14. The system of claim 12, wherein the plurality of lookup tables store the plurality of partial results in a bit-reversed order.

15. The system of claim 12, wherein the size of the input value and the size of the accumulator value are based on respective amounts of bits in the input value and the accumulator value.

16. The system of claim 12, wherein generating the plurality of partial results further comprises performing parallel error checking operations on portions of an output of a XOR operation performed on the input XOR accumulator value and a zero value.

17. The system of claim 12, wherein the operations further comprise extending the second portion with a plurality of zeros.

18. The system of claim 12, wherein the operations further comprise:

receiving a second input value;

determining that a size of the second input value is greater than a size of the accumulator value;

generating a second plurality of partial results from the second input value and accumulator value using the plurality of lookup tables; and performing XOR operations on pairs of the second plurality of partial results to generate a second final result indicating whether there is an error in the second input value.

19. The system of claim 12, wherein the operations further comprise:

receiving a second input value;

determining that a size of the second input value is equal to a size of the accumulator value;

performing a XOR operation on the second input value and the accumulator value to generate a second input XOR accumulator value;

generating a second plurality of partial results from the second input XOR accumulator value using the plurality of lookup tables; and performing XOR operations on pairs of the second plurality of partial results to generate a second final result indicating whether there is an error in the second input value.

20. A non-transitory computer readable medium for storing instructions that, when executed by one or more processors, cause the one or more processors to perform operations for error detection, the operations comprising:

receiving an input value and an accumulator value for detecting errors in the input value;

determining that a size of the input value is less than a size of the accumulator value;

partitioning the accumulator value into a first portion corresponding to the input value and a second portion corresponding to a remainder of the accumulator value;

performing a XOR operation on the input value and the first portion to generate an input XOR accumulator value;

generating a plurality of partial results from the input XOR accumulator value using a plurality of lookup tables;

performing XOR operations on pairs of the plurality of partial results to generate a subsequent partial result; and performing a XOR operation on the subsequent partial result and the second portion to generate a final result to indicate whether there is an error in the input value.

* * * * *